(12) United States Patent
Wun

(10) Patent No.: US 12,717,089 B2
(45) Date of Patent: Aug. 25, 2026

(54) OPTICAL CHIP STRUCTURE AND OPTICAL COMMUNICATION PACKAGE

(71) Applicant: Industrial Technology Research Institute, Hsinchu (TW)

(72) Inventor: Sin-Jhu Wun, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 314 days.

(21) Appl. No.: 18/403,760

(22) Filed: Jan. 4, 2024

(65) Prior Publication Data

US 2025/0164715 A1 May 22, 2025

(30) Foreign Application Priority Data

Nov. 22, 2023 (TW) ................................ 112145097

(51) Int. Cl.
*G02B 6/36* (2006.01)

(52) U.S. Cl.
CPC ......... *G02B 6/3652* (2013.01); *G02B 6/3636* (2013.01); *G02B 6/3644* (2013.01)

(58) Field of Classification Search
CPC .. G02B 6/3652; G02B 6/3636; G02B 6/3644; G02B 6/4243
USPC .............................................. 385/49, 65, 83
See application file for complete search history.

(56) References Cited

U.S. PATENT DOCUMENTS 7,298,941 B2 11/2007 Palen et al.
9,229,169 B2 1/2016 Doany et al.
9,285,554 B2 3/2016 Doany et al.
10,684,419 B2 6/2020 Fortusini et al.
10,795,086 B2 10/2020 Matiss et al.
2004/0032021 A1 2/2004 Shieh et al.
2005/0046928 A1 3/2005 Bischel et al.
(Continued)

FOREIGN PATENT DOCUMENTS

CN 103217740 7/2013
CN 215790926 2/2022
(Continued)

OTHER PUBLICATIONS

"Office Action of Taiwan Counterpart Application", issued on Aug. 9, 2024, pp. 1-6.

*Primary Examiner* — Robert Tavlykaev
(74) *Attorney, Agent, or Firm* — JCIPRNET

(57) ABSTRACT

An optical chip structure is adapted for coupling an optical fiber array. The optical fiber array includes optical fibers arranged side by side. The optical chip structure includes an optical fiber coupling substrate, optical fiber accommodation grooves, and stoppers. The optical fiber accommodating grooves are adapted to accommodate the optical fiber array. The optical fiber accommodating grooves extend along a first axis and are arranged side by side in the optical fiber coupling substrate along a second axis. The first axis is perpendicular to the second axis. The optical fiber accommodating grooves respectively include first ends and second ends opposite to each other. The first ends are located at an edge of the optical chip structure. The stoppers are located in the optical fiber coupling substrate and are respectively located at the second ends. When the optical fiber array is accommodated in the fiber accommodation grooves, the optical fibers are respectively abutted against the stoppers to position in the first axis.

9 Claims, 7 Drawing Sheets

(56) References Cited

U.S. PATENT DOCUMENTS

2006/0159402 A1 7/2006 Ammer et al.
2007/0019920 A1* 1/2007 Tanaka ................. G02B 6/3652 385/137
2013/0114924 A1* 5/2013 Loh .......................... G02B 6/12 385/33
2013/0301982 A1* 11/2013 Lee ...................... G02B 6/4206 29/829
2015/0212277 A1* 7/2015 Guidotti ............... G02B 6/3644 385/52
2019/0049671 A1* 2/2019 Haase .................... G02B 6/382
2019/0094460 A1 3/2019 Brusberg et al.

FOREIGN PATENT DOCUMENTS

TW 201346370 11/2013
TW I679779 12/2019
TW M634923 12/2022

* cited by examiner

OPTICAL CHIP STRUCTURE AND OPTICAL COMMUNICATION PACKAGE

CROSS-REFERENCE TO RELATED APPLICATION

This application claims the priority benefit of Taiwan application serial no. 112145097, filed on Nov. 22, 2023. The entirety of the above-mentioned patent application is hereby incorporated by reference herein and made a part of this specification.

TECHNICAL FIELD

The disclosure relates to a chip structure and a communication package, and more particularly, to an optical chip structure and an optical communication package.

BACKGROUND

In optical communication packaging, positioning of optical fibers is very important. Conventionally, the positioning in an extension direction of the optical fibers is to determine whether a position of the optical fibers is correct by real-time monitoring of coupling efficiency. However, this method is quite time-consuming and complicated. How to position in a quick and simple way is the research direction in the art.

SUMMARY

The disclosure provides an optical chip structure, which has a stopper located in an extension direction of an optical fiber accommodation groove for quickly positioning an optical fiber in this direction.

The disclosure provides an optical communication package, which has the above optical chip structure.

An optical chip structure in the disclosure is adapted for coupling an optical fiber array. The optical fiber array includes multiple optical fibers arranged side by side, and the optical chip structure includes an optical fiber coupling substrate, multiple optical fiber accommodation grooves, and multiple stoppers. The optical fiber accommodation grooves are adapted to accommodate the optical fiber array. The optical fiber accommodation grooves extend along a first axis, and are arranged side by side in the optical fiber coupling substrate along a second axis. The first axis is perpendicular to the second axis. The optical fiber accommodation grooves respectively include multiple first ends and multiple second ends opposite to each other. The first ends are located at an edge of the optical chip structure. The stoppers are located in the optical fiber coupling substrate, and respectively located at the second ends. When the optical fiber array is accommodated in the optical fiber accommodation grooves, the optical fibers are respectively abutted against the stoppers to position in the first axis.

In an embodiment of the disclosure, each of the optical fiber accommodation grooves includes two inclined surfaces to form a V-shaped groove. When each of the optical fibers is accommodated in the corresponding optical fiber accommodation groove, the optical fiber is abutted against the two inclined surfaces of the optical fiber accommodation groove to position in the second axis and a third axis. The third axis is perpendicular to the first axis and the second axis.

In an embodiment of the disclosure, each of the stoppers includes an insertion hole facing the corresponding optical fiber accommodation groove. The insertion hole is adapted for extending into the optical fiber. The insertion hole includes a stepped inner surface to form multiple sections with different apertures and multiple abutment surfaces corresponding to the sections. The optical fiber is adapted to be abutted against one of the abutment surfaces to position in the first axis.

In an embodiment of the disclosure, the optical chip structure further includes multiple lenses respectively disposed beside the second ends of the optical fiber accommodation grooves to be coupled to the optical fibers located in the optical fiber accommodation grooves.

In an embodiment of the disclosure, the optical chip structure further includes multiple spot size converters. The lenses are respectively located between the optical fiber accommodation grooves and the spot size converters, and the spot size converters are respectively coupled to the lenses.

An optical communication package in the disclosure includes the optical chip structure, an optical chip structure, and a package colloid. The optical fiber array includes multiple optical fibers arranged side by side. The optical fibers are respectively accommodated in the optical fiber accommodation grooves and abutted against the stoppers to position in the first axis. The package colloid is filled between the optical fiber accommodation grooves and the optical fibers to fix the optical fibers to the optical fiber accommodation grooves.

In an embodiment of the disclosure, the optical chip structure further includes a communicate groove spanning the optical fiber accommodation grooves, so that the optical fiber accommodation grooves communicate with one another in the second axis, and the package colloid is filled into the communicate groove.

In an embodiment of the disclosure, the optical chip structure further includes a storage groove located on a side of the optical fiber accommodation grooves and connected to the communication groove, and the package colloid is filled into the storage groove.

Based on the above, the optical fiber accommodation grooves of the optical chip structure of the optical communication package in the disclosure extend along the first axis and are arranged side by side in the optical fiber coupling substrate along the second axis. The first ends of the optical fiber accommodation grooves are located at the edge of the optical chip structure. The stoppers are located in the optical fiber coupling substrate and are respectively located at the second ends. When the optical fiber array is accommodated in the optical fiber accommodation grooves, the optical fibers are respectively abutted against the stoppers to position in the first axis. Therefore, the position of the optical fibers in the extension direction when placed on the optical chip structure may be easily determined without using other methods (such as optical methods) to determine whether the position of the optical fibers on the first axis is in place, in which the assembly is quite convenient and simple, thereby reducing production costs and having the advantage of the high yield rate.

DETAILED DESCRIPTION OF DISCLOSED EMBODIMENTS

Figure 1:
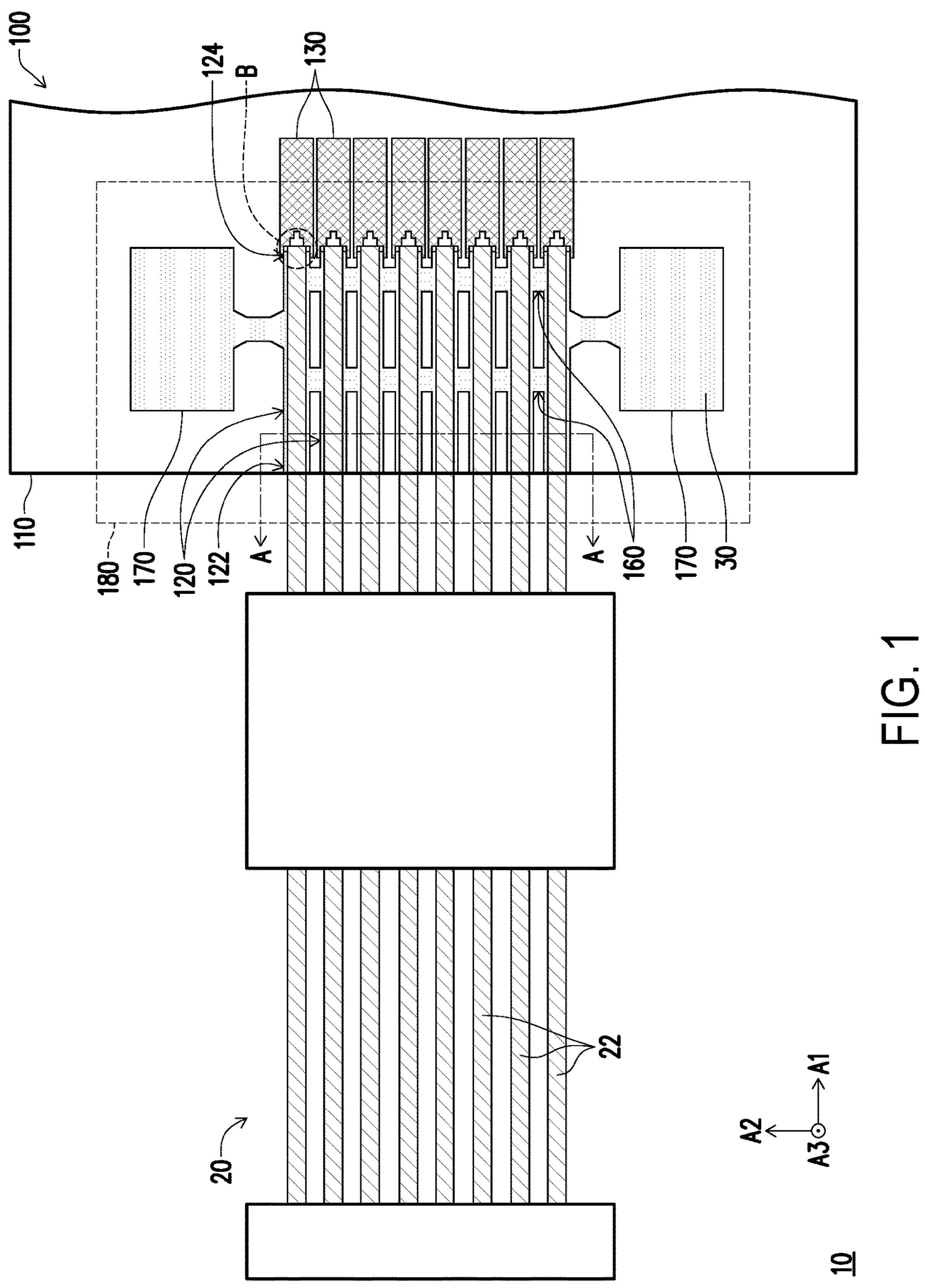
FIG. 1 is a schematic partial view of an optical communication package according to an embodiment of the disclosure.

FIG. 1 is a schematic partial view of an optical communication package according to an embodiment of the disclosure. Referring to FIG. 1, an optical communication package 10 in this embodiment includes an optical chip structure 100, an optical fiber array 20, and a package colloid 30. The optical chip structure 100 is configured to couple the optical fiber array 20. The optical fiber array 20 includes multiple optical fibers 22 arranged side by side.

The optical chip structure 100 includes an optical fiber coupling substrate 110, multiple optical fiber accommodation grooves 120, and multiple stoppers 130. The optical fiber accommodation grooves 120 are configured to accommodate the optical fibers 22 respectively. The optical fiber accommodation grooves 120 extend along a first axis A1 and are arranged side by side in the optical fiber coupling substrate 110 along a second axis A2. In this embodiment, the first axis A1 is perpendicular to the second axis A2.

The optical fiber accommodation grooves 120 respectively include multiple first ends 122 and multiple second ends 124 opposite to each other. The first ends 122 are located at an edge (another end away from/opposed to the stopper 130 in FIG. 1) of in the optical chip structure 100. The stoppers 130 are located in the optical fiber coupling substrate 110, and are located on the second ends 124 of the optical fiber accommodation grooves 120 respectively.

In this embodiment, when the optical fibers 22 are accommodated in the optical fiber accommodation grooves 120, the optical fibers 22 are respectively abutted against the stoppers 130, so that the optical fibers 22 are positioned in the first axis A1.

Figure 2:
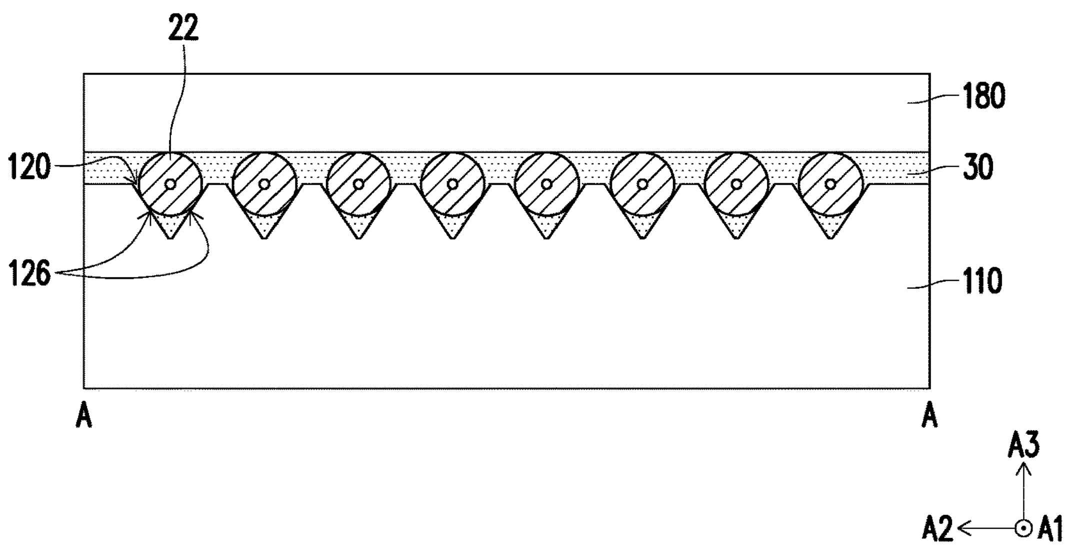
FIG. 2 is a schematic cross-sectional view taken along a line segment A-A of the optical communication package in FIG. 1.

FIG. 2 is a schematic cross-sectional view taken along a line segment A-A of the optical communication package in FIG. 1. Referring to FIG. 2, in this embodiment, each of the optical fiber accommodation grooves 120 includes two inclined surfaces 126 to form a V-shaped groove. When each of the optical fibers 22 is accommodated in the corresponding optical fiber accommodation groove 120, the optical fiber 22 is abutted against the two inclined surfaces 126 of the optical fiber accommodation groove 120, so that the optical fiber 22 is positioned in the second axis A2 and a third axis A3. In this embodiment, the third axis A3 is perpendicular to the first axis A1 and the second axis A2.

Therefore, in this embodiment, when the optical fiber 22 is placed on the optical fiber accommodation groove 120, since the optical fiber 22 is abutted against the stopper 130 and the two inclined surfaces 126 of the optical fiber accommodation groove 120, the optical fiber 22 may be easily positioned in the first axis A1, the second axis A2, and third axis A3. As shown in FIG. 1, the package colloid 30 is filled between the optical fiber accommodation grooves 120 and the optical fibers 22 to fix the optical fibers 22 to the optical fiber accommodation grooves 120.

Compared to the conventional technology in which it is determined whether a position of the optical fiber 22 in the first axis A1 is correct by real-time monitoring of coupling efficiency, and then packaging is performed after the measurement is completed and the positioning is determined, such that this method is quite time-consuming and complicated, the optical communication package 10 in the disclosure may complete the positioning through the optical fiber 22 abutted against the stopper 130 and the two inclined surfaces 126 of the optical fiber accommodation groove 120 without measuring the coupling efficiency, in which the assembly is quite convenient and simple, and has an advantage of a high yield rate.

It is worth mentioning that in this embodiment, the stopper 130 has a special design that may position the optical fibers 22 of different sizes, which will be described in the following.

Figure 3A:
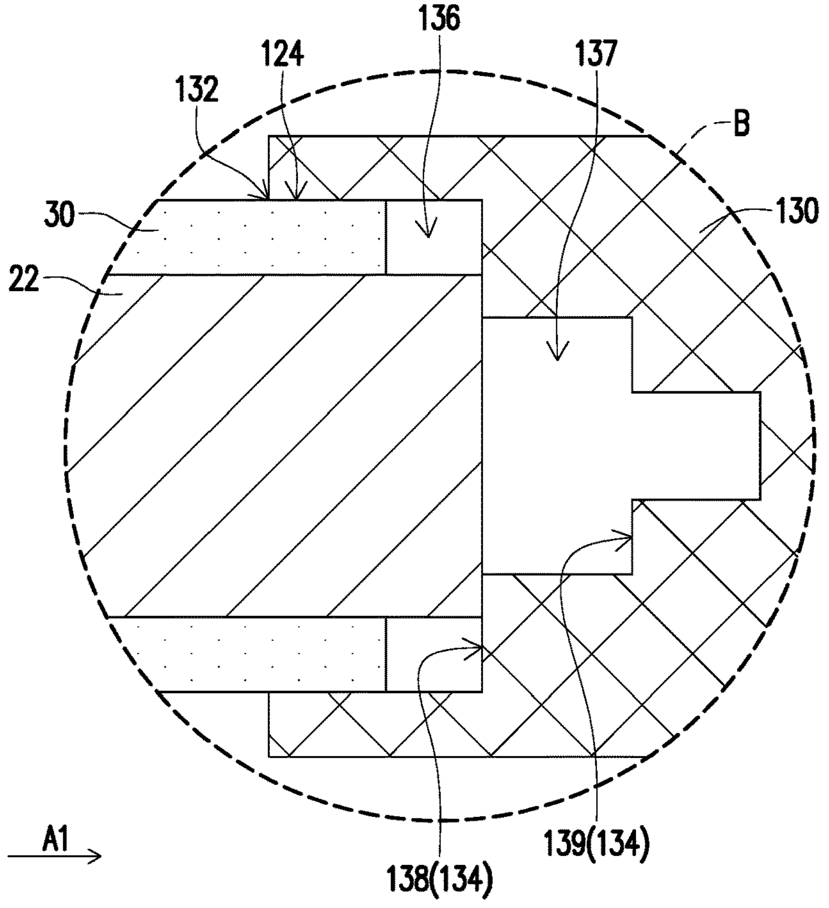
FIG. 3A is a schematic enlarged view of an area B of the optical communication package in FIG. 1.

FIG. 3A is a schematic enlarged view of an area B of the optical communication package in FIG. 1. Referring to FIG. 3A, in this embodiment, the stopper 130 includes an insertion hole 132 facing the corresponding optical fiber accommodation groove 120. The insertion hole 132 is adapted for extending into the optical fiber 22. The insertion hole 132 includes a stepped inner surface 134 to form multiple sections 136 and 137 with different apertures and multiple abutment surfaces 138 and 139 corresponding to the sections 136 and 137. The optical fiber 22 is adapted to be abutted against one of the abutment surfaces 138 and 139 to position in the first axis A1.

Therefore, as shown in FIG. 3A, the thicker optical fiber 22 may extend into the section 136 and be abutted against the abutment surface 138 to position in the first axis A1. In an embodiment, if the thinner optical fiber 22 is adopted, it may extend into the section 136 and the section 137 and be abutted against the abutment surface 139. Of course, the number of sections and abutment surfaces in the stopper 130 is not limited thereto. In other embodiments, the number of sections and abutment surfaces may also be more than two each. In addition, the number of sections and abutment surfaces may be only one each.

Figure 3B:
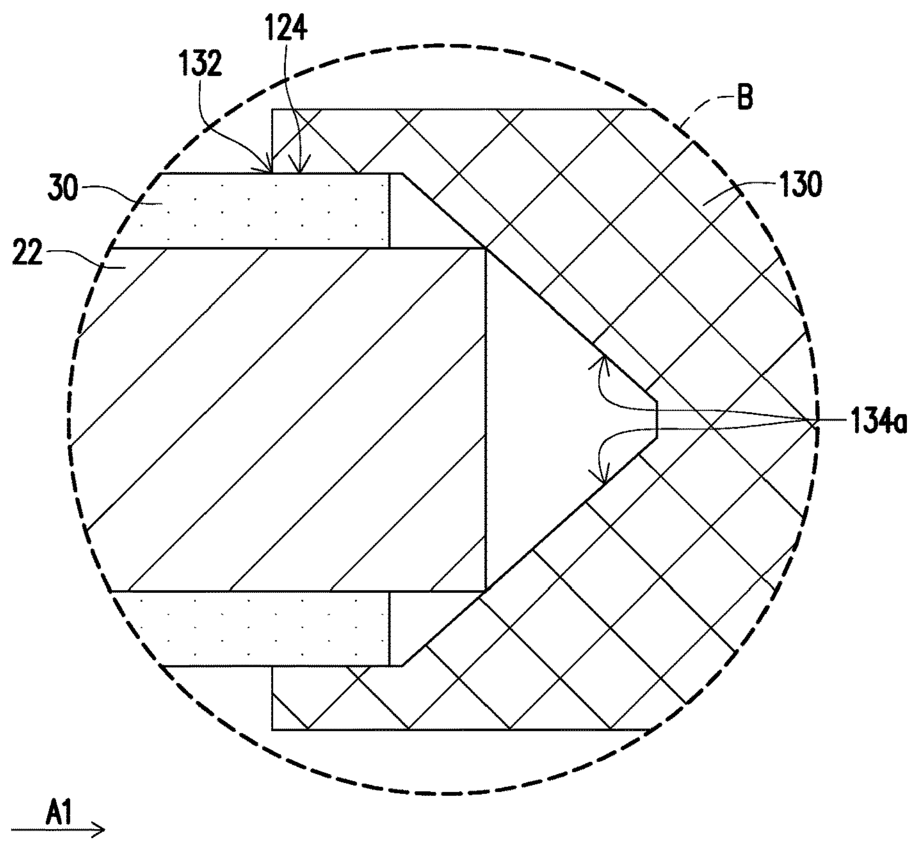
FIG. 3B is a schematic partial enlarged view of an optical communication package according to an embodiment of the disclosure.

FIG. 3B is a schematic partial enlarged view of an optical communication package according to an embodiment of the disclosure. Referring to FIG. 3B, in this embodiment, the insertion hole 132 includes an inclined inner surface 134*a*, and the optical fiber 22 is adapted to be abutted against the inclined inner surface 134*a* to position in the first axis A1. In other embodiments, the inclined inner surface 134*a* may also be a conical structure with a pointed end. Of course, a form in the insertion hole 132 is not limited to the above.

Figure 4:
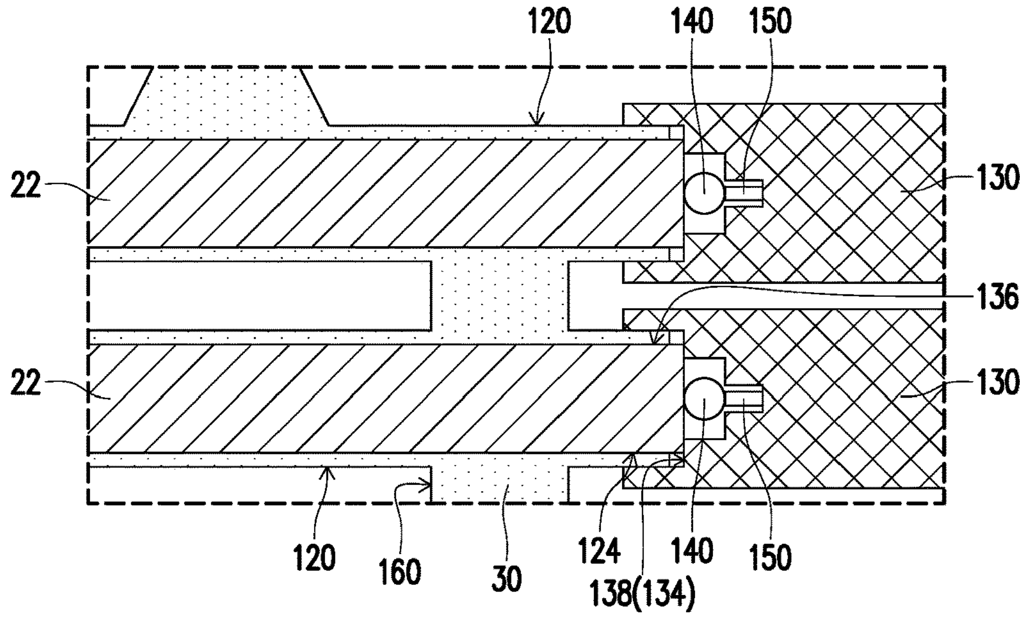
FIG. 4 is a schematic partial enlarged view of an optical communication package according to an embodiment of the disclosure.

FIG. 4 is a schematic partial enlarged view of an optical communication package according to an embodiment of the disclosure. Referring to FIG. 4, in this embodiment, multiple lenses 140 and multiple spot size converters 150 are further included. The lenses 140 are respectively disposed beside the second ends 124 of the optical fiber accommodation grooves 120 to be coupled to the optical fibers 22 located in the optical fiber accommodation grooves 120.

In addition, the lenses 140 are respectively located between the optical fiber accommodation grooves 120 and the spot size converters 150. The spot size converters 150 are respectively coupled to the lenses 140 and multiple waveguides (not shown).

Since an end surface of the optical fiber 22 may be beveled, a light beam may not enter in a forward direction when entering the optical fiber 22, resulting in a decrease in the coupling efficiency. In this embodiment, the lens 140 is disposed beside the optical fiber 22, which may improve the coupling efficiency. In addition, the spot size converter 150 may be configured to convert a spot size, so that the light beam passing through the lens 140 may be better coupled to the waveguide through the spot size converter 150 to have a better coupling effect.

Figure 5A:
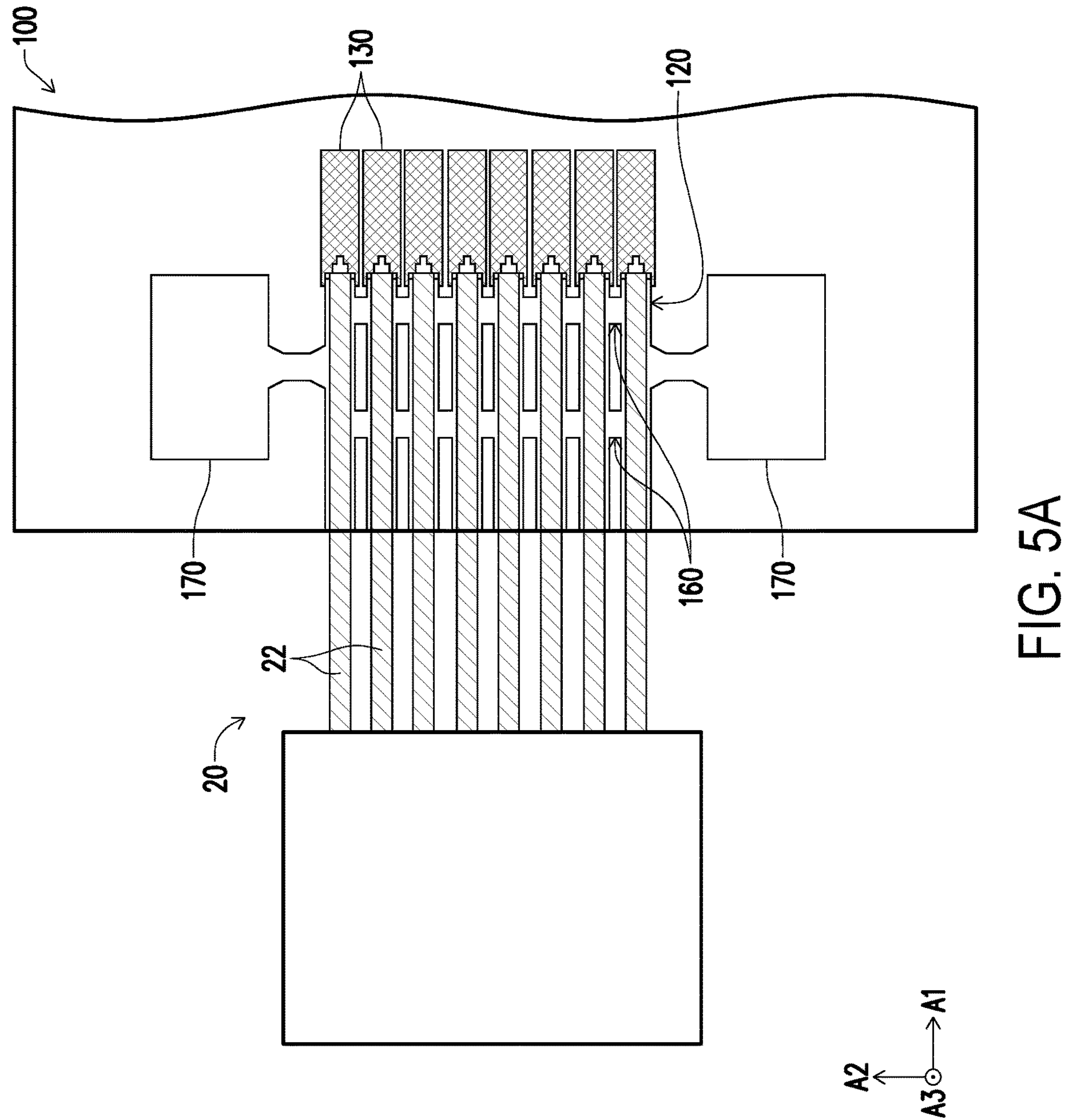
FIGS. 5A to 5C are schematic views of a packaging process of the optical communication package in FIG. 1.
Figure 5B:
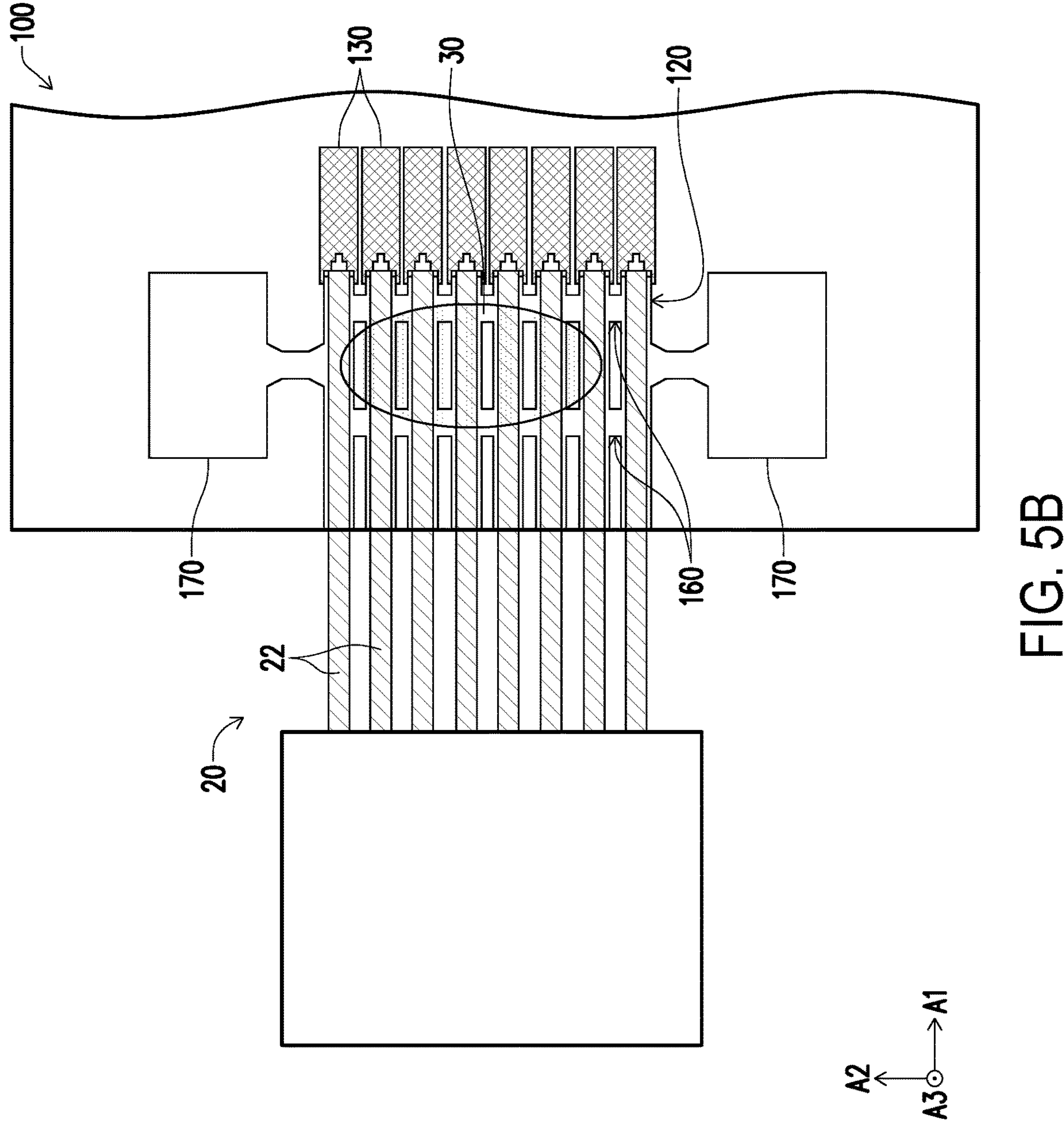
Figure 5C:
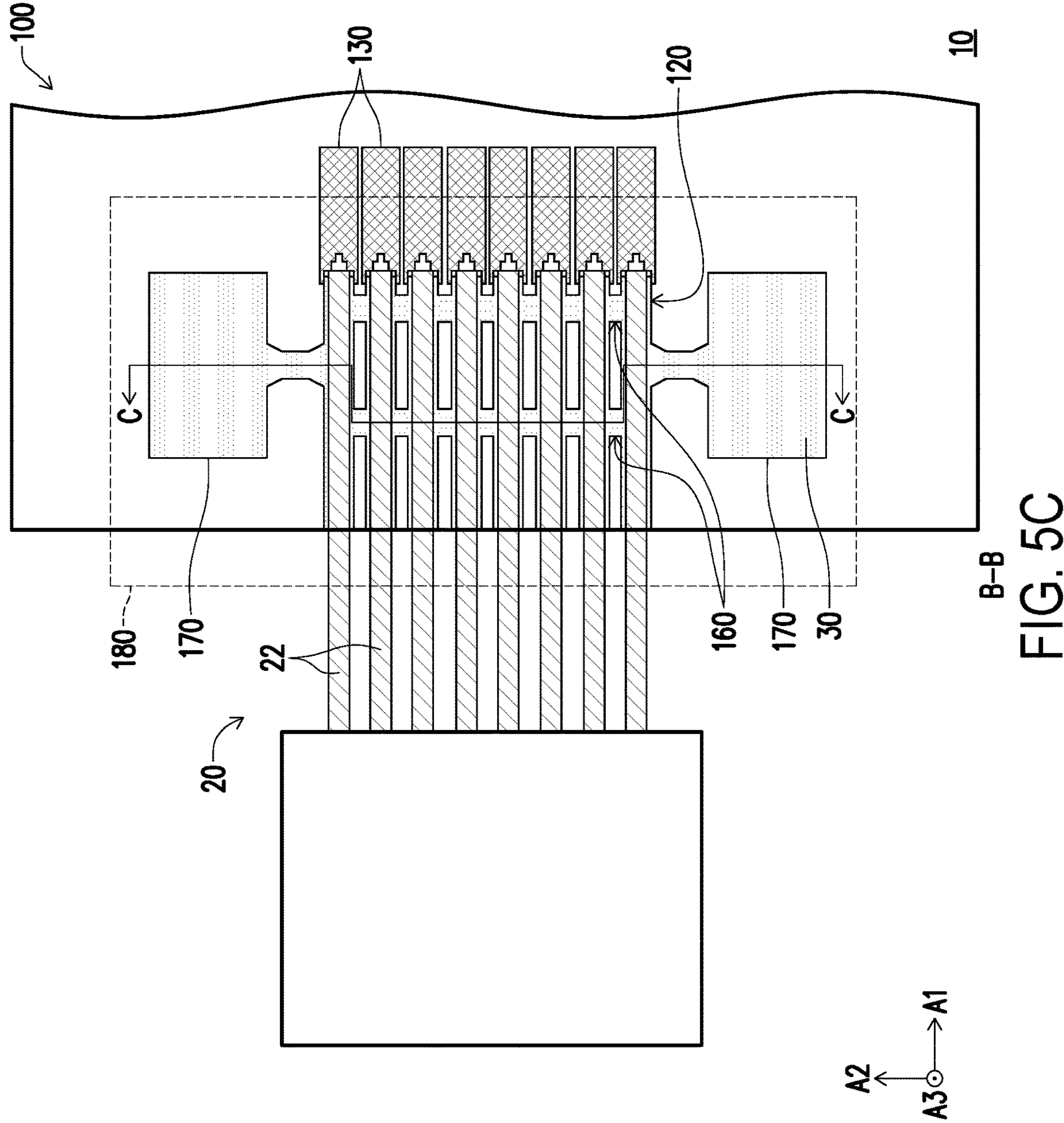
Figure 5D:
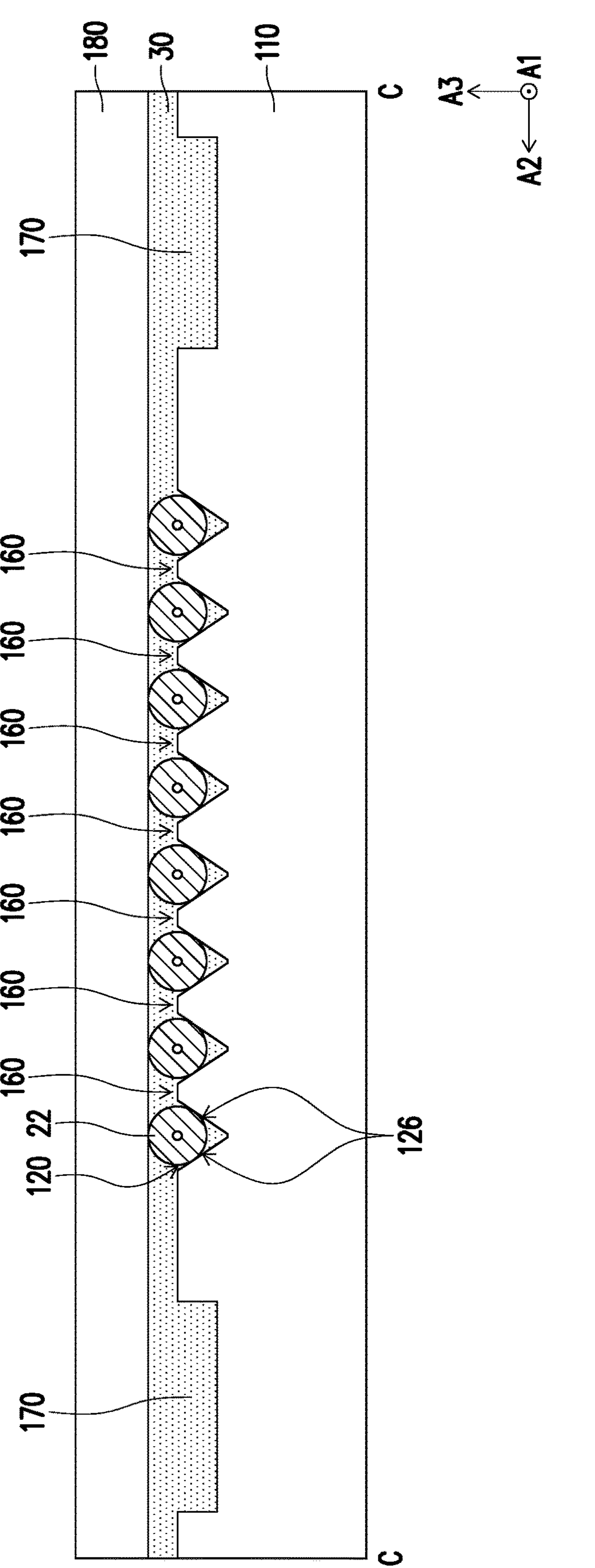
FIG. 5D is a schematic cross-sectional view taken along a line segment C-C in FIG. 5C.

FIGS. 5A to 5C are schematic views of a packaging process of the optical communication package in FIG. 1. FIG. 5D is a schematic cross-sectional view taken along a line segment C-C in FIG. 5C. Referring to FIGS. 1 and 5A, in this embodiment, the optical chip structure 100 further includes a communication groove 160 and a storage groove 170. The communication groove 160 spans the optical fiber accommodation grooves 120, so that the optical fiber accommodation grooves 120 communicate with one another in the second axis A2 (FIG. 5D). The storage groove 170 is located next to the optical fiber accommodation grooves 120 and connected to the communication groove 160. In this embodiment, the number of communication grooves 160 and storage grooves 170 is two each. Of course, the number of communication grooves 160 and storage grooves 170 is not limited thereto.

During the packaging process of the optical communication package, as shown in FIG. 5A, first, the optical fiber 22 is placed in the optical fiber accommodation groove 120, and the optical fiber 22 is abutted against the abutment surface 138 (FIG. 3A) and the two inclined surfaces 126 (FIG. 2) of the optical fiber accommodation groove 120, so as to position in the first axis A1, the second axis A2, and the third axis A3.

Next, referring to FIGS. 5B and 5C, the package colloid 30 is added to a top of the optical fiber 22 and covered with a cover 180. The package colloid 30 will be filled into the optical fiber accommodation groove 120, the storage groove 170, and the communication groove 160. The two communication grooves 160 may enable the uncured package colloid 30 to flow faster between the optical fiber accommodation grooves 120, so that the package colloid 30 may better flow between the optical fiber 22 and the optical fiber accommodation groove 120 such that the optical fiber 22 is well fixed. The two storage grooves 170 are located on upper and lower sides of the optical fiber accommodation grooves 120 and are connected to the two communication grooves 160 to accommodate the excess package colloid 30 and effectively avoid glue overflow.

Based on the above, the optical fiber accommodation grooves of the optical chip structure of the optical communication package in the disclosure extend along the first axis and are arranged side by side in the optical fiber coupling substrate along the second axis. The first ends of the optical fiber accommodation grooves are located at the edge of the optical chip structure. The stoppers are located in the optical fiber coupling substrate and are respectively located at the second ends. When the optical fiber array is accommodated in the optical fiber accommodation grooves, the optical fibers are respectively abutted against the stoppers to position in the first axis. Therefore, the position of the optical fibers in the extension direction when placed on the optical chip structure may be easily determined without using other methods (such as optical methods) to determine whether the position of the optical fibers on the first axis is in place, in which the assembly is quite convenient and simple, thereby reducing production costs and having the advantage of the high yield rate.

What is claimed is:

1. An optical chip structure, adapted for coupling an optical fiber array, wherein the optical fiber array comprises a plurality of optical fibers arranged side by side, and the optical chip structure comprises:

an optical fiber coupling substrate;

a plurality of optical fiber accommodation grooves adapted to accommodate the optical fiber array, wherein the optical fiber accommodation grooves extend along a first axis and are arranged side by side in the optical fiber coupling substrate along a second axis, the first axis is perpendicular to the second axis, the optical fiber accommodation grooves respectively comprise a plurality of first ends and a plurality of second ends opposite to each other, and the first ends are located at an edge of the optical chip structure; and a plurality of stoppers located in the optical fiber coupling substrate and respectively located at the second ends, wherein when the optical fiber array is accommodated in the optical fiber accommodation grooves, the optical fibers are respectively abutted against the stoppers to position in the first axis, wherein each of the stoppers comprises an insertion hole facing the corresponding optical fiber accommodation groove, the optical fiber is adapted to insert into the insertion hole, the insertion hole comprises a stepped inner surface to form a plurality of sections with different apertures and a plurality of abutment surfaces corresponding to the sections, and the optical fiber is adapted to be abutted against one of the abutment surfaces to position in the first axis.

2. The optical chip structure according to claim 1, wherein each of the optical fiber accommodation grooves comprises two inclined surfaces to form a V-shaped groove, when each of the optical fibers is accommodated in the corresponding optical fiber accommodation groove, the optical fiber is abutted against the two inclined surfaces of the optical fiber accommodation groove to position in the second axis and a third axis, and the third axis is perpendicular to the first axis and the second axis.

3. The optical chip structure according to claim 1, further comprising:

a plurality of lenses respectively disposed beside the second ends of the optical fiber accommodation grooves to be coupled to the optical fibers located in the optical fiber accommodation grooves.

4. The optical chip structure according to claim 3, further comprising:

a plurality of spot size converters, wherein the lenses are respectively located between the optical fiber accommodation grooves and the spot size converters, and the spot size converters are respectively coupled to the lenses.

5. The optical chip structure according to claim 1, further comprising:

a communicate groove spanning the optical fiber accommodation grooves, so that the optical fiber accommodation grooves communicate with one another in the second axis.

6. The optical chip structure according to claim 5, further comprising:

a storage groove located on a side of the optical fiber accommodation grooves and connected to the communication groove.

7. An optical communication package, comprising:

the optical chip structure according to claim 1;

an optical fiber array comprising a plurality of optical fibers arranged side by side, wherein the optical fibers are respectively accommodated in the optical fiber accommodation grooves and abutted against the stoppers to position in the first axis; and a package colloid filled between the optical fiber accommodation grooves and the optical fibers to fix the optical fibers to the optical fiber accommodation grooves.

8. The optical communication package according to claim 7, wherein the optical chip structure further comprises:

a communicate groove spanning the optical fiber accommodation grooves, so that the optical fiber accommodation grooves communicate with one another in the second axis, and the package colloid is filled into the communicate groove.

9. The optical communication package according to claim 8, wherein the optical chip structure further comprises:

a storage groove located on a side of the optical fiber accommodation grooves and connected to the communication groove, and the package colloid is filled into the storage groove.

* * * * *